2,886,770
Patented May 12, 1959

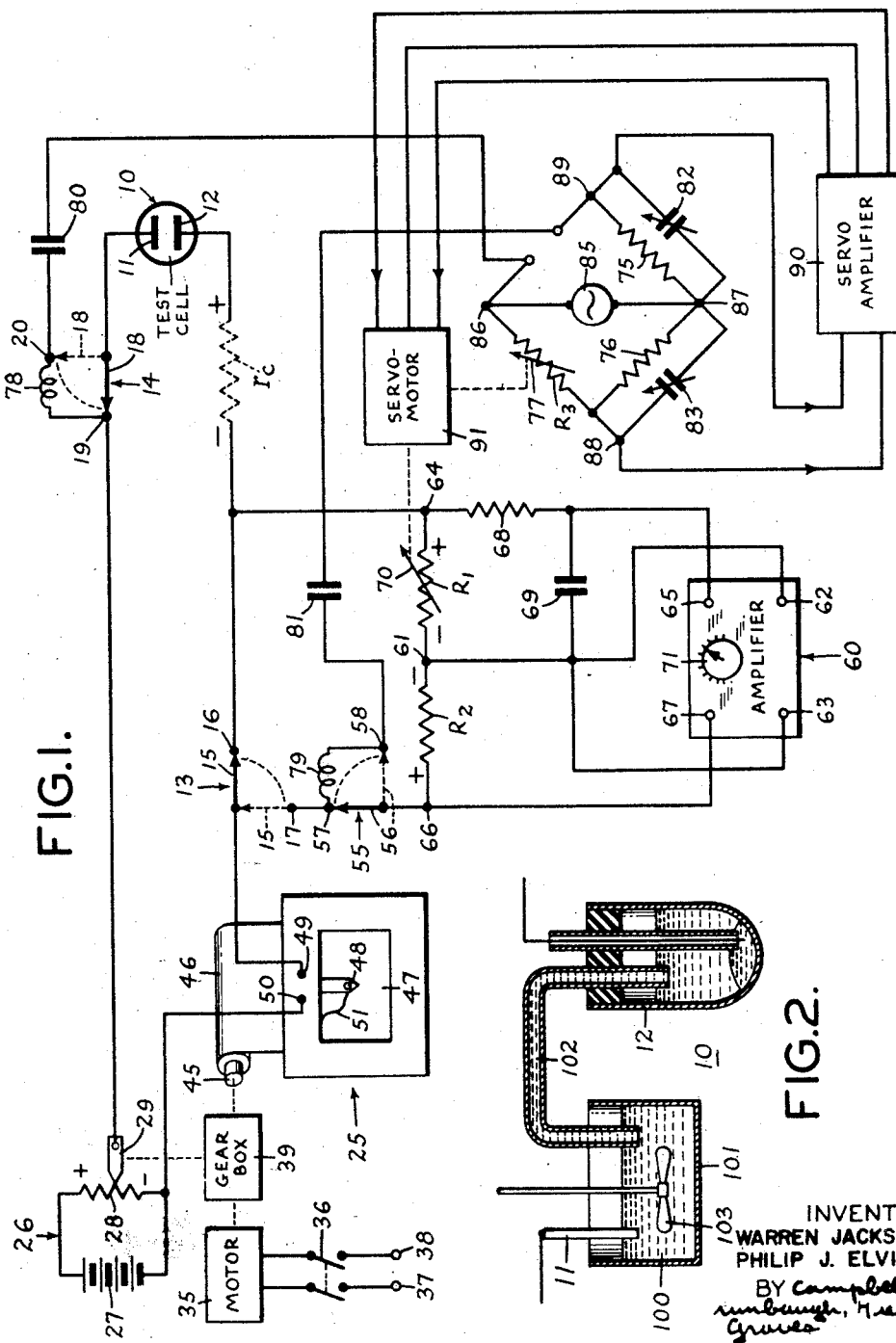

2,886,770

POLAROGRAPHIC METHOD AND APPARATUS

Warren Jackson, Jr., Lyndhurst, Ohio, and Philip J. Elving, Ann Arbor, Mich., assignors to The Standard Oil Company, Cleveland, Ohio, a corporation of Ohio Application July 7, 1954, Serial No. 441,802

24 Claims. (Cl. 324—30)

The present invention relates generally to polarographic method and apparatus and, more particularly, to method and apparatus of the above-noted character wherein the internal resistance voltage drop of the electro-chemical test cell, in relation to which polarographic analysis is conducted, is eliminated as a factor in the polarographic measurements obtained.

As discussed in U.S. Patent 2,246,981, issued to L. A. Matheson et al., and entitled, "Apparatus and Method for Electro-Chemical Analysis," the term "polarography" refers to a technique of electro-chemical analysis wherein a polarization voltage which changes in value over a time interval is induced in an electro-chemical test cell, and measurements are made over this interval of the value of cell current produced for each value of polarization voltage. The several values of polarization voltage and cell current may be correlated together (to provide an indication of the characteristics of the reaction taking place within the cell solution) by tabulating polarization voltage and cell current against each other, or by plotting by hand a graph of the polarization voltage-cell current curve. For rapid analysis, however, it is highly convenient to obtain an automatic plotting of the polarization voltage-cell current curve either in transient form (as, say, by an electron beam trace upon the screen of a cathode ray tube as disclosed in the aforementioned patent to Matheson) or in permanent form as by a record upon a record strip.

It is evident, where automatic plotting is used, that any point on the plotted curve should be easily readable in terms of the true polarization voltage so that the significance of the curve as a whole can be readily ascertained. Such easily readable condition is afforded, for example, where the voltage coordinate position of points on the curve bear (in terms of the scale used for this coordinate) a pre-selected constant ratio to the true values of polarization voltage existing in the test cell for these plotted points. Thus, if the pre-selected constant ratio is 1:1, any point on the curve will represent a polarization voltage exactly equal to the voltage coordinate position of this point expressed in the scale used for this coordinate. In other words, a point on the curve having a voltage coordinate position of plus ½ unit will represent plus ½ volt of true polarization voltage in the test cell. Where convenient, other pre-selected constant ratios may be used as, for example, 2:1, in which case a point on the curve having a voltage coordinate position of ½ unit would represent one volt of true polarization voltage.

When a voltage is applied for polarography purposes across an electro-chemical test cell, the voltage drop through the cell is resolvable into two components, namely, the true polarization voltage $V_p$ induced in the cell, and another component $V_c$ caused by the internal resistance $r_c$ of the cell. This internal resistance voltage drop $V_c$ is an extraneous factor insofar as polarography measurements are concerned, but with a test cell employing an aqueous cell solution is negligible, so that within the limits of accuracy required, the polarization voltage $V_p$ may be considered to equal the voltage $V_a$ applied to the cell. Accordingly, for automatic polarographic plotting with aqueous cell solutions the desired pre-selected constant ratio, between the true polarization voltage and the voltage coordinate position of points on the plotted curve, may be obtained by displacing the plotting element (e.g., the beam spot of a cathode ray tube or the stylus of a recorder) so that each position thereof directly represents (according to the voltage coordinate scale) the value of the voltage $V_a$ applied across the cell.

Where, however, a test cell employing a non-aqueous cell solution is subjected to polarographic analysis, the internal resistance $r_c$ of the cell may be on the order of thousands or tens of thousands of ohms, causing the internal resistance voltage drop $V_c$ to become an appreciable fraction of the true polarization voltage $V_p$. This relatively large value of $V_c$ poses a number of problems in automatic plotting. Test cells employing different non-aqueous cell solutions will be characterized by a different internal resistance $r_c$ in each case so that for a given amount of current flowing through the cell the proportional relation between the component $V_p$ and the applied voltage $V_a$ will vary from cell to cell. Moreover, even if it is assumed that the internal resistance $r_c$ of a cell remains constant throughout a given polarographic analysis, the cell current itself is determined in part by the cell reaction so that the ratio $V_a/V_p$ will vary unpredictably. Moreover, it has been found that for many non-aqueous cell solutions the internal resistance $r_c$ of the cell does not remain constant over the time interval required for an analysis with the result that another unpredictable factor causes variance in the ratio $V_a/V_p$. It follows that when a non-aqueous cell solution is employed, the voltage $V_a$ applied to the cell is not a reliable measure of the true polarization voltage $V_p$ induced in the cell.

As a result of the described difficulties in making polarographic analysis of test cells with non-aqueous solutions, it has been the practice in the past to make a preliminary automatic plot of the applied voltage-cell current curve and to then correct this preliminary automatic plot by hand to reduce the same to a curve of true polarization voltage-cell current. Correction by hand while yielding the data desired, is laborious and time consuming, usually taking from 15 to 30 minutes per analysis performed. Moreover, the preliminary automatic plot and subsequent hand correction technique, although the best heretofore available, is not satisfactory for the additional reason that a constant rate of change of polarization voltage (desirable to insure maximum accuracy of result) is not obtained even though the applied voltage $V_a$ is made to change linearly with time.

It is an object of the present invention accordingly, to provide new and improved polarographic method and apparatus which is free from the above-noted difficulties and disadvantages of prior polarographic practice.

Another object of the invention is to provide method and apparatus of the above-noted character wherein a pre-selected constant ratio may be maintained over the course of a polarographic analysis between the true polarization voltage in the cell and a voltage external to the cell permitting the last-named voltage to be used as a simple measure of the polarization voltage.

A further object of the invention is to provide method and apparatus of the above-noted character, wherein the mentioned constant ratio may be maintained at its pre-selected value from one polarographic analysis to another.

A further object of the invention is to provide method and apparatus of the above-noted character, wherein the mentioned pre-selected constant ratio may be maintained regardless of changes in the internal resistance of the cell over the course of a polarographic analysis.

A still further object of the invention is to provide method and apparatus of the above-noted character wherein the polarization rate may be kept constant.

An additional object of the invention is to provide method and apparatus of the above-noted character permitting a direct automatic plot to be obtained of true polarization voltage vs. cell current.

These and other objects of the invention are attained by providing in accordance with the invention a circuit for applying a voltage across an electro-chemical test cell to produce in the cell the desired polarization voltage together with the mentioned extraneous, but inherent resistance voltage drop. An electrical energy source means is coupled in this circuit for developing an exciting voltage which supplies through the circuit at least a fraction of the voltage applied across the cell. A feed-back means is also coupled in the circuit for boosting the polarization voltage by boosting the voltage applied to the cell as a function of the current passing through the cell. To vary the quantitative relation between voltage boost and cell current an adjustable control means is interposed in the circuit. For a proper setting of this adjustable control means there may be attained a voltage boost-cell current relation which establishes a pre-selected constant ratio between the true polarization voltage of the cell and the exciting voltage. The exciting voltage may accordingly be used as a simple measure of the true polarization voltage, the extraneous factor of the internal resistance voltage drop of the cell being eliminated as a measurement factor.

As an additional feature of the invention, there is provided a second circuit for passing an alternating current through the test cell. This second circuit includes a sensing means responsive to the alternating current for automatically adjusting the aforementioned adjustable control means to boost, in the manner described, the true polarization voltage by an amount which establishes the desired pre-selected constant ratio between the true polarization voltage and the exciting voltage.

The invention may be better understood from the following detailed description of a typical form thereof, taken in conjunction with the accompanying drawings, in which:

Figure 1 is a schematic diagram of polarographic apparatus constructed according to the invention; and Fig. 2 is a view showing details of the electro-chemical test cell of Fig. 1.

Referring now to Fig. 1, there is shown an electrochemical test cell 10 having an indicating electrode 11 and a reference electrode 12. The internal resistance of cell 10 is shown by the symbolic resistor designated $r_c$. Test cell 10 is interposed between a pair of single pole, double-throw switches 13, 14, of which switch 13 has a movable contact 15 and fixed contacts 16, 17 while switch 14 has a movable contact 18 and fixed contacts 19, 20. When switches 13, 14 are thrown so that movable contacts 15, 18 close, respectively, with their associated fixed contacts 16, 19, the test cell 10 is connected in a loop circuit with a recorder 25 and an electrical energy source means 26, the several elements of the loop circuit being serially coupled around the circuit. With switches 13, 14 in the positions described, the circuit forms a conventional polarographic testing system suitable for use with aqueous cell solutions.

Considering the two last-named components of the loop circuit, the electrical energy source means 26 takes the form of a D.C. energy source 27 (shown as a battery) which develops a constant D.C. potential across a potentiometer 28. Potentiometer 28 has a variable tap 29 which is connected in the circuit so that at least a fraction of the voltage $V_e$ (the exciting voltage) appearing between tap 29 and the lower end of the potentiometer is applied across the test cell 10. Since, with the presently described connections, there are no resistances or other components of substantial impedance value interposed in the circuit between potentiometer 28 and test cell 10, the full value of the exciting voltage is applied across the cell, or in other words, the exciting voltage $V_e$ equals the applied voltage $V_a$.

To initiate a polarographic analysis a conventional electric motor 35 is energized by throwing a double-pole, single-throw switch 36 to connect the motor through the terminals 37, 38 to an electrical energy source (not shown). When energized, motor 35 drives a gear box 39 which in turn moves variable tap 29 at a constant rate from the lower to the upper end of potentiometer 28. Preferably, potentiometer 28 is so constructed that as tap 29 moves, the exciting voltage starts at zero value and increases in a manner which is linear with time. However, within the scope of this invention the exciting voltage may change in any manner over the course of a polarographic analysis providing that the exciting voltage has different values at the beginning and end of the analysis and that the rate of change of the exciting voltage is relatively slow compared to an A.C. signal to be later described. It is also within the scope of this invention to have the exciting voltage change either positively or negatively from its initial value providing that there is a net change in absolute magnitude of the exciting voltage over the course of an analysis. Accordingly, it will be understood that the word "boost" as hereafter used, refers to a boost in absolute magnitude of the quantity considered irrespective of whether the boost effects a negative-going or a positive-going change of the quantity in terms of polarity.

Gear box 39 concurrent with its function of moving tap 29 performs the additional function of operating recorder 25 by driving a shaft 45 thereof upon which is rolled a record strip 46. Record strip 46 accordingly moves vertically through a plotting area 47 in which there is located a plotting stylus 48. Plotting stylus 48 is actuated by conventional means (not shown) within recorder 25 to undergo horizontal displacements in direct proportion to the amount of current passing through test cell 10 via the recorder terminals 49, 50. At the same time, by appropriate gearing within the gear box 39 the instantaneous position of record strip 46 is made to bear a pre-selected constant ratio to the value of the exciting voltage concurrently developed by movement of tap 29. Accordingly, the stylus 48 will trace out over record strip 46 an exciting voltage-cell current curve, as shown by the line 51. The vertical position of any point on this curve will represent (according to the scale used for the vertical coordinate of the plot) a simple measure of the value of the then existing exciting voltage. For example, the relation between plot position and exciting voltage may be 1:1 such that one unit of vertical displacement of strip 46 as measured by the vertical coordinate scale (whether a linear scale or another scale such as logarithmic) represents one unit of exciting voltage.

It will be understood that gear box 39 includes conventional means (not shown) for resetting tap 29 and recorder 25 after completion of an analysis.

As stated, when test cell 10 employs an aqueous cell solution, the voltage drop through the internal resistance $r_c$ of the cell is negligible, with the result that the voltage $V_a$ applied across the cell may be equated with $V_p$, the true polarization voltage of the cell. The applied voltage $V_a$ in turn, for the described circuit connections equals $V_e$, the exciting voltage developed by tap 29. Accordingly, the curve traced out by stylus 48 is equivalent to a true polarization voltage-cell current curve in which the vertical positions of points on the curve represent a simple meaure of the true polarization voltage.

When, on the other hand, test cell 10 contains a non-aqueous cell solution, the internal resistance $r_c$ becomes, as described, relatively large with the result that the polarization voltage $V_p$ becomes only a fraction of the applied voltage $V_a$, the ratio $V_a/V_p$ being unpredictably variable. Hence, the applied voltage $V_a$ is no longer a reliable measure of the polarization voltage $V_p$. At the same time it is desirable, for the reasons described, that the curve traced by stylus 48 on record strip 46 be a simple representation of the true polarization voltage. The solution to this problem, according to the invention, is to continuously boost the applied voltage $V_a$ over the course of analysis to impart a corresponding boost to the polarization voltage in cell 10 such that the polarization voltage at all times bears a constant ratio of pre-selected value to the exciting voltage $V_e$. Since the vertical displacements of record strip 46 are, in accordance with the previous description, a simple measure of the exciting voltage $V_e$, it will be seen that with a boosting action of the nature described, the vertical displacement of strip 46 will also represent a simple measure of the true polarization voltage $V_p$.

To provide the described boosting action, the movable contact 15 of switch 13 is thrown to open with fixed contact 16 and to close with fixed contact 17. Additionally, another switch 55 (shown in Fig. 1 below switch 13) having a movable contact 56 and fixed contacts 57, 58, is maintained with its movable contact 56 in closed relation with its fixed contact 57. The described dispositions of switches 13 and 55 interpose, between the reference electrode 12 (of test cell 10) and the recorder 25, an additional circuit branch including resistor means in the form of the connection in series relation of resistance means represented by resistor $R_1$ and current detecting means represented by resistor $R_2$. Resistors $R_1$ and $R_2$ are coupled respectively to the input and output terminals of an amplifier means 60 in such manner that the junction 61 between the resistors is coupled to the input terminal 62 and to the output terminal 63, which terminals normally correspond to grounded terminals for the amplifier. Further, the non-common terminals 64 and 66 of resistors $R_1$ and $R_2$ are coupled, respectively, to the signal input and output terminals 65 and 67 of amplifier 60. A filter means comprised of the high impedance resistor 68 and the low impedance capacitor 69 is interposed between resistor $R_1$ and the input terminals of amplifier 60 in order to suppress noise and oscillation.

Amplifier 60 should preferably provide a stable amplification factor and should be of the low pass type having a sharp cut-off at 10 c.p.s. With regard to circuit values the resistances $R_1$ and $R_2$ should be very much smaller than the internal resistance $r_c$ of the test cell 10. Thus, resistances $R_1$ and $R_2$ may have values on the order of tens of ohms when (as is commonly the case with non-aqueous cell solutions) the internal resistance $r_c$ is of the order of thousands of ohms or greater.

For the circuit connections shown in Fig. 1, current will flow through test cell 10 and around the loop circuit in a clockwise direction so that the current passes from right to left through the series coupling of resistors $R_1$ and $R_2$. Accordingly, a voltage $V_1$ in the nature of a drop is developed between the terminals of resistor $R_1$, the value of this intra-terminal voltage being in direct proportion to the value of the cell current $(i)$. This first intra-terminal voltage is supplied as an input to amplifier 60 to be amplified therein and to appear at the output thereof as a second intra-terminal voltage $V_2$ applied between the terminals of resistor $R_2$. This second intra-terminal voltage, however, acts (in terms of the direction of current flow around the loop circuit) as a voltage rise in series-aiding relation with the voltage rise represented by the exciting voltage $V_e$. Amplifier 60 is thus in the nature of a voltage source which develops across the resistance of resistor $R_1$ a voltage which in the loop circuit is serially aiding with the exciting voltage. By virtue of the introduction of this series aiding voltage, the applied voltage $V_a$ is boosted over and above the fraction thereof contributed by $V_e$ by at least a fraction of the second intra-terminal voltage.

Considering now the voltage and current relations around the loop circuit, the junction point 61 between resistors $R_1$ and $R_2$ may be conveniently thought of as the point of zero voltage. Although the cell current $(i)$ passes from right to left through resistor $R_2$ to develop a voltage drop therein, this voltage drop is so small (in view of the very small value of $R_2$ compared to $r_c$) as to be insignificant and will accordingly be neglected. Assuming that amplifier 60 has an amplification factor K, there may be set down according to Kirchoff's law the following expression:

$$V_e + V_2 = V_c + V_1 + V_p$$
$$V_1 = iR_1,\ V_2 = KV_1 = KiR_1$$
$$V_c = ir_c$$

Substituting for $V_1$, $V_2$ and $V_c$ we get:

$$V_e + KiR_1 = ir_c + iR_1 + V_p$$

Suppose that $V_p = V_e$ (the desired condition in which the polarization is boosted to equal the exciting voltage). Then, $$KiR_1 = ir_c + iR_1$$

or $$R_1 = r_c/(K-1)$$

The value of $r_c$ for the case of certain non-aqueous cell solutions remains substantially constant throughout a polarographic analysis. Given this constant value of $r_c$ (which constant value can be determined prior to the analysis in a manner well known to the art), if K has a fixed value and $R_1$ is caused to assume a value which satisfies the last set-forth equation, it will be seen from the derivation above that the polarization voltage $V_p$ will be sufficiently boosted by $V_2$ so that $V_p$ will equal $V_e$, the exciting voltage. The proper value for $R_1$ to satisfy the equation may be imparted to the resistor by making the resistor a variable one and adjusting the resistance value thereof by an adjustable control means represented by the arrow 70. With resistor $R_1$ being adjustable, as described, it will be seen that the heretofore mentioned resistor means comprised of resistors $R_1$ and $R_2$ is an adjustable resistor means, and that the mentioned series aiding voltage is developed across at least a portion of this adjustable resistor means inasmuch as such voltage is developed across resistor $R_2$.

Note that with $R_1$ set to an appropriate value as described, that in the derivation above the polarization voltage $V_p$ will equal the exciting voltage $V_e$ regardless of the amount of cell current $(i)$ flowing around the loop circuit. Accordingly, throughout the polarographic analysis $V_p$ will bear a constant ratio value to $V_e$, the ratio in the present instance being of the pre-selected value 1:1. As a result of this constant ratio of pre-selected value between $V_p$ and $V_e$, the vertical displacements of points on curve 51 will be a simple measure of the true polarization voltage.

Where test cells containing different non-aqueous solutions are used successively the pre-selected value of the ratio $V_e/V_p$ (as, say, the pre-selected value 1:1) can be maintained by determining the internal resistance $r_c$ of the cell in each case and by then setting $R_1$ to the value prescribed in the last set forth equation of the derivation above.

It will be evident that when occasion demands it (as, for example, when resistors are interposed in the loop circuit between potentiometer 28 and test cell 10, so that $V_a$ is only a fractional amount of $V_e$) that some other constant value may be selected for the ratio $V_e/V_p$ as, for example, the ratio 2:1. Also it will be evident that the element which determines the proper quantitative relation between cell current and polarization voltage boost need not necessarily be the resistor such as $R_1$ having a variable characteristic. Alternatively, this proper quantitative relation can be determined by, say, a gain control 71 for amplifier 60 which varies the value of the amplification factor K, the amplifier 60 thus being a controllable voltage source in at least the sense that the series aiding voltage developed thereby across the resistance of resistor $R_1$ can be controlled by adjusting the gain control 71.

Where the amplification factor K has a large value as, say, 100, the concluding equation in the derivation above reduces to a usable approximation to the following simple expression:

$$R_1 = r_c/K$$

In accordance with the above expression, if K has a value of 100, $R_1$ can easily be set by following the simple formula that the value of $R_1$ should be 1/100 of the value of $r_c$.

Heretofore it has been assumed that the internal resistance $r_c$ of the test cell will remain constant throughout a polarographic analysis. It has been found, however, that for many non-aqueous cell solutions, this assumption is not justified in that, in fact, $r_c$ does vary appreciably during the analysis. When $r_c$ so varies, a significant error may be introduced into the polarographic measurements made by the heretofore described circuits. In accordance with the invention, however, the factor of a variable internal resistance $r_c$ may be dealt with in the following manner. In the presence of variable $r_c$ the switches 14 and 55 are thrown so that their respective movable contacts 18 and 56 open with their respective fixed contacts 19 and 57 and close with their respective fixed contacts 20 and 58. With switches 14 and 55 in such disposition, the portion of the loop circuit including test cell 10, resistor $R_1$ and resistor $R_2$ becomes (in terms of an A.C. signal) one arm of an A.C. bridge, the other arms of which are provided by the fixed resistors 75, 76 and the variable resistor $R_3$ having the adjustable control 77.

To provide for isolation of the primary loop circuit from A.C. signals flowing in the bridge, an inductance coil 78 is connected between fixed contacts 19 and 20 of switch 14, while a similar inductance coil 79 is connected between fixed contacts 57 and 58 of switch 55. It will be evident that D.C. currents will flow freely from exciting voltage source 26 through inductance 78, test cell 10, resistor $R_1$, resistor $R_2$, inductance 79 and back to the source 26. On the other hand, alternating signals, being constrained from passing through the inductances will travel only from the bridge through test cell 10, resistor $R_1$, resistor $R_2$ and back to the A.C. bridge. To isolate the A.C. bridge from D.C. currents in the primary loop circuit, the capacitors 80 and 81 are interposed between the bridge and, respectively, the fixed contacts 20 and 58. It is evident that these capacitors will permit free passage of alternating signals, but will effectively block the passage of D.C. signal. When necessary the variable capacitors 82, 83 may be coupled across the resistance arms 75, 76 of the bridge to compensate for any reactance in the bridge arm which includes test cell 10.

To energize the bridge, an alternating current source 85 having a high frequency (as, say, 400 c.p.s.) relative to the rate of variation of the exciting voltage (as, say, ½ c.p.s.) is connected between the diagonal terminals 86 and 87 of the bridge. For proper results the A.C. frequency should be above the low pass cut off frequency for amplifier 60. Also the amplitude of the A.C. voltage should be sufficiently small that the A.C. current passing through cell 10 has a negligible effect on the reaction taking place therein. It will be noted that amplifier 60 plays no part in the operation of the bridge circuit since this amplifier, being of the low pass type, will accept only signals having a rate of variation of no greater order than the exciting voltage rate (½ c.p.s.).

The A.C. voltage appearing between the conjugate diagonal terminals 88, 89 is supplied to the the input of a conventional servo-amplifier 90, which in turn operates, in a well known manner, a positioning servo-motor 91. The shaft of motor 91, which is adapted to assume an angular displacement from an initial position as a function of the voltage initially appearing across terminals 88, 89, drives the adjustable control 77 of resistor $R_3$ to change the value of $R_3$.

The relations between the several resistance arms of the bridge (including the resistance arm of $r_c$, $R_1$ and $R_2$ in series), the voltage developed between terminals 88, 89, the angular displacement imparted to the shaft of motor 91 responsive to this voltage, and the subsequent change in value of resistor $R_3$ are such that the A.C. bridge together with servo-amplifier 90 and servo-positioning motor 91 form, in a well known manner, a closed-loop null-seeking servo-mechanism. This servo-mechanism by means of a mechanical coupling between the shaft of servo-motor 91 and the adjustable control 70 of resistor $R_1$ is, for any encountered value of $r_c$, adapted to automatically adjust $R_1$ to the proper setting, so that the desired pre-selected constant ratio is attained between the exciting voltage $V_e$ and the true polarization voltage $V_p$ of the test cell.

To explain further the action of the servo-mechanism, assume that for a condition of balance of the A.C. bridge, $R_3$ must equal $r_c$. Assume further that at the start of a new polarographic analysis the A.C. bridge is in a condition corresponding to balance for the value of $r_c$ at the end of a previous polarographic analysis. It will also be assumed that the value of $r_c$ at the start of the new polarographic analysis is 20% greater than the value of $r_c$ at the end of the old analysis.

At the start of the new polarographic analysis, it will be evident that $R_3$ will have a value less than that necessary for balance of the A.C. bridge. Also, assuming that the desired constant ratio $V_e/V_p$ has been pre-selected to have a value 1:1, the heretofore derived equation:

$$R_1 = r_c/(K-1)$$

applies. In accordance with this equation (assuming that the amplification factor K is fixed) the desired value of $R_1$ which equalizes polarization voltage and exciting voltage is linearly related to $r_c$. Hence, at the start of the new analysis, $R_1$ will also have to increase by 20% in order to establish the desired 1:1 ratio for $V_e/V_p$.

Since $R_3$ is less than its value required for bridge balance, the A.C. bridge at the start of the new analysis will be unbalanced to produce a voltage between terminals 88, 89. This voltage is in the nature of an error signal which represents in essence the disparity in value between the exciting voltage $V_e$ developed by tap 29 and the polarization voltage $V_p$ developed in test cell 10. Responsive to the voltage between terminals 88, 89, the servo-amplifier 90 causes the shaft of servo-motor 91 to be angularly displaced from its initial position at the start of the analysis by an amount commensurate with the magnitude of the error signal voltage. The shaft of motor 91 in moving to its new position, causes a corresponding re-setting of adjustable control 77 to increase the resistance value of $R_3$ so that when the shaft comes to rest, the resistance of $R_3$ will have been boosted 20%. For this increased value of $R_3$, the A.C. bridge reassumes a balanced condition so that the voltage between terminals 88, 89 drops to zero. Accordingly, the servo-mechanism including the A.C. bridge, the servo-amplifier and the servo-motor will undergo no further action until another change occurs in the value of $R_c$.

At the same time that the shaft of servo-motor 91 moves to increase the resistance of $R_3$ by 20%, the mentioned shaft also drives the adjustable control 70 of resistor $R_1$ to increase the resistance value thereof by a corresponding amount percentagewise, or in other words, by 20%. This increased value of $R_1$ is the value required, as described, to establish the desired preselected constant ratio of 1:1 between the exciting voltage $V_e$ and the polarization voltage $V_p$. Accordingly, at the start of the new polarographic analysis, the system automatically adjusts itself so that $V_e$ becomes a simple measure of $V_p$. The automatic establishment of the last-named relation gives rise in turn to the automatic establishment of a relation between the polarization voltage values and the vertical displacements of corresponding points on curve 51, such that these vertical displacements represent (in terms of the scale used for the vertical coordinate) a simple measure of the true polarization voltage in test cell 10.

Although the described change in the value of resistor $R_1$ causes a corresponding change in the resistance value of the arm of the A.C. bridge including resistances $r_c$, $R_1$, and $R_2$, the value of $R_1$ is so small relative to that of $r_c$ that the change occurring in the over-all resistance of the mentioned bridge arm is negligible in percentage terms, and hence, can be disregarded.

In view of the foregoing, it will be seen that the described polarographic system compensates for a change of internal resistance $r_c$ of a test cell between the end of one polarographic analysis and the start of another. It will also be seen, by operation of the servo-mechanism in a manner similar to that heretofore described, that the polarographic system will automatically compensate for any change in value of $r_c$ which occurs during the course of any particular polarographic analysis. It will be seen, moreover, that the mentioned A.C. bridge servo-amplifier 90 and servo-motor 91 are in the nature of electro-mechanical translator means which receives input current from the cell, and which provides a mechanical output to the mentioned adjustable resistor means such that this resistor means is adjusted to render the mentioned series aiding voltage a function of the input current to said translator means.

Thus, the internal resistance $r_c$ of the test cell may, at all times, be eliminated as a significant factor in the polarographic measurements.

Referring now to Fig. 2, the figure shows in detail a typical test cell 10 adapted to be used in connection with the described polarographic system. In test cell 10, the reference electrode 12 is comprised of a saturated calomel half-cell, while the indicating electrode 11 is immersed in a quantity of cell solution 100 contained by a container means 101. Although the indicating electrode 11 is shown in Fig. 2 as a graphite electrode, the indicating electrode may also satisfactorily take the form of a dropping mercury electrode. To provide electrical coupling between the electrodes 11 and 12, an aqueous agar bridge 102 is disposed to communicate between the cell solution 100 and the solution of the half-cell 12. To provide for homogeneous ion concentration in the cell solution during a polarographic test, a rotary stirrer 103 is disposed within the cell.

If, as a matter of convenience in polarographic analysis, it is found desirable to use a test cell having a reasonably constant internal resistance $r_c$ over the course of the analysis, such test cell is obtainable by substituting in place of the calomel reference electrode 12 and bridge 102 a metal-metal salt electrode disposed directly in the cell solution. For example, it has been found that an Ag—Ag Cl reference electrode can be so used.

The illustrative embodiment shown in the drawings and described herein is obviously susceptible to considerable modification in form and detail within the spirit of the invention. The embodiment, therefore, is to be regarded as illustrative only and not as limiting the scope of the following claims.

We claim:

1. Polarograph apparatus comprising a circuit with a pair of terminals for applying voltage across an electro-chemical test cell to produce therein a polarization voltage and an extraneous but inherent internal resistance voltage drop, electrical energy source means coupled in said circuit between said terminals for producing an exciting voltage which supplies through said circuit at least a fraction of the voltage applied across said cell, resistance means coupled in said circuit between said source means and one of said terminals, a voltage source coupled to said resistance means to develop thereacross in a voltage which is series aiding in said circuit with said exciting voltage to boost said polarization voltage by boosting said applied voltage, current detecting means coupled in said circuit in series relation with said resistance means and adapted responsive to cell current in said circuit to control as a function of the cell current said series aiding voltage developed by said voltage source, said current detecting means, voltage source and resistance means forming components of a feedback system of which at least one component input thereof is controllable to vary the input/output ratio of said system, and adjustable control means for controlling said one component to vary said input/output ratio to thereby vary the amount of polarization voltage boost produced for a given amount of said cell current, said adjustable control means for an appropriate setting thereof providing a voltage boost-cell current relation which establishes a pre-selected constant ratio between said polarization voltage and said exciting voltage, said exciting voltage accordingly representing a measure of said polarization voltage which excludes the extraneous factor of said internal voltage drop.

2. Polarograph apparatus comprising, a circuit with a pair of terminals for applying voltage across an electro-chemical test cell to produce therein a polarization voltage and an extraneous but inherent internal resistance voltage drop, electrical energy source means coupled in said circuit between said terminals for producing an exciting voltage which supplies through said circuit at least a fraction of the voltage applied across said cell, impedance means coupled in said circuit between said source means and one of said terminals to develop an impedance voltage as a function of the current passing through said cell, resistance means coupled in said circuit in series relation with said impedance means, amplifier means having its input coupled to receive said impedance voltage and its output coupled to said resistance means to develop thereacross a voltage which is series aiding in said circuit said exciting voltage to boost said polarization voltage by boosting said applied voltage by at least a fraction of said impedance voltage as amplified, and adjustable control means in circuit with said amplifier means to vary the amount of polarization voltage boost produced for a given amount of said cell circuit, said adjustable control means for an appropriate setting thereof providing a voltage boost-cell current relation which establishes a pre-selected constant ratio between said polarization voltage and said exciting voltage, said exciting voltage accordingly representing a measure of said polarization voltage which excludes the extraneous voltage of said internal resistance voltage drop.

3. Polarograph apparatus comprising, a circuit for applying a voltage across an electro-chemical test cell to produce therein a polarization and an extraneous but inherent internal resistance voltage drop, electrical energy source means coupled in said circuit for producing over a time interval a changing exciting voltage which supplies through said circuit at least a fraction of a changing voltage applied across said cell, first impedance means coupled in said circuit to develop a first intra-terminal voltage as a function of the current passing through said cell, second impedance means coupled in said circuit for boosting said polarization voltage by boosting said applied voltage by at least a fraction of a second intra-terminal voltage developed across said second impedance means, amplifier means having its input terminals coupled to include and exclude therebetween, respectively, said first and second impedance means and its output terminals coupled to produce said second intra-terminal voltage across said second impedance means, and an adjustable control means in circuit with said amplifier means to vary the amount of boost of polarization voltage produced for a given amount of said cell current in the causation sequence of cell current, first intra-terminal voltage, second intra-terminal voltage, applied voltage boost and polarization voltage boost, said adjustable control means for an appropriate setting thereof providing a voltage boost-cell current relation which establishes a pre-selected constant ratio between said polarization voltage and said exciting voltage, said exciting voltage accordingly representing a measure of said polarization voltage which excludes the extraneous factor of said internal resistance voltage drop.

4. Polarograph apparatus comprising, a circuit for applying a voltage across an electro-chemical test cell to produce therein a polarization and an extraneous but inherent internal resistance voltage drop, electrical energy source means coupled in said circuit for producing over a time interval a linearly changing first voltage which supplies through said circuit at least a fraction of a linearly changing voltage applied across said cell, first resistor means of small order relative to the internal resistance of said cell and coupled in said circuit to develop a first intra-terminal voltage as a function of the current passing through said cell, second resistor means of small order relative to said internal resistance and coupled in said circuit to boost said polarization voltage by boosting said applied voltage by at least a fraction of a second intra-terminal voltage developed across said second resistor means, amplifier means for producing an output of said second intra-terminal voltage responsive to an input of said first intra-terminal voltage, and adjustable means control in circuit with one of said amplifier means to vary the amount of polarization voltage boost produced for a given amount of said cell current in the causation sequence of cell current, first intra-terminal voltage, second intra-terminal voltage applied voltage boost and polarization voltage boost, said adjustable control means for an appropriate setting thereof providing a voltage boost-cell current relation which establishes a pre-selected constant ratio between said polarization voltage and said first voltage, the internal resistance voltage drop of said cell being accordingly eliminated as a measurement factor.

5. Polaragraph apparatus comprising a circuit including the serially coupled elements of first and second resistors of small order relative to the internal resistance of said cell and a source of exciting voltage which changes linearly over a time interval, said circuit being adapted to pass current through an electro-chemical test cell, said apparatus further comprising a low pass amplifier having its input coupled across only said first resistor and its output coupled across only said second resistor to produce a voltage thereacross in series-aiding relation with said exciting voltage, a filter interposed between said first resistor and the input of said amplifier, and an adjustable control for varying the quantitative relation between the amount of current passing through said first resistor and the amount of voltage applied across said cell.

6. Polarograph apparatus comprising a first circuit with a pair of terminals for applying direct current voltage across an electro-chemical test cell to produce therein a polarization voltage and an extraneous but inherent internal resistance voltage drop, electrical energy source means coupled in said circuit between said terminals for producing an exciting voltage which supplies through said circuit at least a fraction of the voltage applied across said cell, resistance means coupled in said circuit between said source means and one of said terminals, a voltage source coupled to said resistance means to develop thereacross a voltage which in said circuit is series aiding with said exciting voltage to boost said polarization voltage by boosting said applied voltage, current detecting means coupled in said circuit in series relation with said resistance means and adapted in response to cell current in said circuit to control as a function thereof said series aiding voltage developed by said voltage source, said current detecting means, voltage source and resistance means forming components of a feed-back system of which at least one component is controllable to vary the input/output feed-back ratio of said system, a second circuit coupled to said terminals for passing alternating current through said cell, and sensing means coupled in said second circuit between said terminals and responsive to the alternating current therein for automatically controlling said one component of said feedback system to vary said input/output ratio to thereby provide a voltage boost-cell current relation which establishes a pre-selected proportional relation between said polarization voltage and said exciting voltage, said exciting voltage accordingly representing a measure of said polarization voltage which excludes the extraneous factor of said internal resistance voltage drop.

7. Polarograph apparatus as in claim 6 wherein said sensing means is a closed-loop null-seeking electro-mechanical servo system.

8. Polarograph apparatus for use with an electro-chemical test cell comprising a first circuit for applying direct current voltage across said electro-chemical test cell to produce therein a polarization voltage and an extraneous but inherent internal resistance voltage drop, electrical energy source means coupled in said circuit for producing an exciting voltage which supplies through said circuit at least a fraction of the voltage applied across said cell, controllable feedback means coupled in said circuit to boost said polarization voltage by boosting said applied voltage, an alternating current bridge of which one arm includes said cell, and means responsive to unbalance of said bridge caused by a new internal resistance value for said cell for rebalancing said bridge and for automatically controlling said feedback means to provide a voltage boost-cell current relation which establishes a pre-selected constant ratio between said polarization voltage and said exciting voltage, said exciting voltage accordingly representing a measure of said polarization voltage which excludes the extraneous factor of said internal resistance voltage drop.

9. Polarograph apparatus as in claim 8 further characterized by means for isolating said first circuit from alternating currents in said bridge and means for isolating said bridge from direct currents in said first circuit.

10. Polarograph apparatus for use with an electro-chemical test cell comprising a circuit including the serially coupled elements of first and second resistors and a source of exciting voltage which changes over a time interval, said circuit being adapted to pass current through said cell, said apparatus further comprising, an amplifier having its input coupled with said first resistor and its output coupled with said second resistor to develop a voltage thereacross in series-aiding relation with said exciting voltage, an adjustable control for varying the quantitative relation between the current passing through said first resistor and the voltage applied across said cell, an A.C. bridge one arm of which includes said test cell and another arm of which includes an adjustable resistor, and a positioning motor responsive to unbalance of said bridge for rebalancing said bridge by adjusting said adjustable resistor and for adjusting said adjustable control to increase the voltage applied across said cell by an amount whereby the polarization voltage of said cell is maintained in a preselected constant ratio with said exciting voltage.

11. Polarograph apparatus as in claim 10 further characterized by capacitors isolating said A.C. bridge from direct currents passing through said cell and inductance elements isolating said source of exciting voltage from alternating currents in said bridge.

12. Polarograph apparatus for use with an electro-chemical test cell comprising a circuit including the serially coupled elements of first and second resistors and a source of exciting voltage which changes over a time interval, said circuit being adapted to pass current through said cell, said apparatus further comprising, an amplifier having its input coupled with said first resistor and its output coupled with said second resistor to develop a voltage thereacross in series-aiding relation with said exciting voltage, an adjustable control for varying the quantitative relation between the current passing through said first resistor and the voltage applied across said cell, a second circuit for passing alternating current through said cell, and sensing means responsive to current in said second circuit for automatically adjusting said adjustable control to increase the voltage applied across said cell by an amount whereby the polarization voltage of said cell is maintained in a pre-selected constant ratio with said changing voltage.

13. Polarograph apparatus for use with an electro-chemical test cell comprising a circuit including the serially coupled elements of first and second resistors of small order relative to the internal resistance of said cell and a source of exciting voltage which changes linearly over a time interval, said circuit being adapted to pass current through said cell, said apparatus further comprising a low pass amplifier having its input coupled across only said first resistor and its output coupled across only said second resistor to produce a voltage thereacross in series-aiding relation with said exciting voltage, a filter interposed between said first resistor and the input of said amplifier, an adjustable control for varying the quantitative relation between the amount of current passing through said first resistor and the amount of voltage applied across said cell, an A.C. bridge an arm of which includes said test cell and another arm of which includes an adjustable resistor, and a positioning motor responsive to unbalance of said bridge for rebalancing said bridge by adjusting said adjustable resistor and for adjusting said adjustable control to increase the voltage applied across said cell by an amount whereby the polarization voltage of said cell is maintained in pre-selected constant ratio with said exciting voltage.

14. A polarographic method comprising the steps of, generating a direct current exciting voltage to be used as a measure of the polarization voltage in an electro-chemical test cell, applying at least a fraction of said exciting voltage across said cell to produce therein said polarization voltage together with an extraneous but inherent internal resistance voltage drop, and boosting in response to current passing through said cell the voltage applied to said cell to thereby boost said polarization voltage by an amount establishing a pre-selected constant ratio between said polarization voltage and said exciting voltage, said exciting voltage accordingly representing a simple measure of said polarization voltage which excludes the extraneous factor of said internal resistance voltage drop.

15. A polarographic method comprising the steps of, generating a direct current exciting voltage to be used as a measure of the polarization voltage in an electro-chemical test cell, applying at least a fraction of said exciting voltage across said cell to produce therein said polarization voltage together with an extraneous but inherent internal resistance voltage drop, producing a voltage drop external to said cell commensurate with the current flowing therethrough, amplifying said last-named voltage drop, and applying at least a fraction of the amplified voltage across said cell to boost the polarization voltage thereof by an amount establishing a pre-selected proportional relation between said polarization voltage and said exciting voltage, said exciting voltage accordingly representing a simple measure of said polarization voltage which excludes the extraneous factor of said internal resistance voltage drop.

16. A polarograph method comprising the steps of, generating a direct current exciting voltage to be used as a measure of the polarization voltage in an electro-chemical test cell, applying at least a fraction of said exciting voltage across an electro-chemical test cell to create therein said polarization voltage together with an extraneous but inherent internal resistance voltage drop, passing an alternating current through said cell to produce a signal indicative of the internal resistance of said cell, and boosting in response to said signal the voltage applied across said cell to thereby boost said polarization voltage by an amount establishing a pre-selected constant ratio between said polarization voltage and said exciting voltage, said exciting voltage accordingly representing a simple measure of said polarization voltage which excludes the extraneous factor of said internal resistance voltage drop.

17. A polarographic method comprising the steps of, generating a direct current exciting voltage to be used as a simple measure of the polarization voltage in an electro-chemical test cell, applying at least a fraction of said exciting voltage across said cell to produce therein said polarization voltage together with an extraneous but inherent internal resistance voltage drop, passing an alternating current through said cell to produce a signal indicative of the internal resistance of said cell, producing a voltage drop external to said cell commensurate with the direct current flowing therethrough, amplifying said last-named voltage drop, applying to said cell at least a fraction of the amplified voltage to boost the cell polarization voltage, and automatically controlling by said signal the amount of said boost so that a pre-selected constant ratio is established between said polarization voltage and said exciting voltage, said exciting voltage accordingly representing a measure of said polarization voltage which excludes the extraneous factor of said internal resistance voltage drop.

18. A correction network adapted to be used with polarographic apparatus by insertion of said network into a component circuit thereof providing a series path for current passing through an electro-chemical cell under test by said apparatus, said network when so inserted being adapted to eliminate the extraneous measurement factor of the resistance voltage drop in said cell, said network comprising in combination, first and second network terminals for serially coupling said network into said series current path, amplifying means with a stable amplification characteristic having the signal terminal of the input thereof couple with said first network terminal, the signal terminal of the output thereof coupled with said second network terminal, and the other terminal of said input coupled in a common connection with the other terminal of said output, first resistor means coupled between said first network terminal and said common connection to provide therebetween an electrical resistance of a value on the order of tens of ohms, second resistance means coupled between said second network terminal and said common connection to provide therebetween an electrical resistance of said value, and adjustable control means for varying the quantitative relation between the amount of test cell current flowing through said network, when coupled into said series current path, and the amount of voltage applied from the output of said amplifying means across said second resistor means, the said network being adapted to act in said series current path as a source of voltage which varies in value in accordance with the value of current flowing through said electro-chemical test cell.

19. Polarograph apparatus comprising an electro-chemical test cell, a circuit with a pair of terminals to apply voltage across said cell, an electrical energy source coupled in said circuit between said terminals to produce an exciting voltage which supplies through said circuit at least a fraction of the voltage applied across said cell, a resistance coupled in said circuit between said source and one of said terminals, a controllable voltage source coupled to said resistance to develop thereacross a voltage which in said circuit is series aiding with said exciting voltage, and current detecting means coupled in said circuit in series relation with said resistance and adapted responsive to cell current in said circuit to control as a function of said current said series aiding voltage developed by said controllable voltage source.

20. Polarograph apparatus for use with an electrochemical test cell, said apparatus comprising a circuit with a pair of terminals to apply voltage across said cell, an electrical energy source coupled in said circuit between said terminals to produce an exciting voltage which supplies through said circuit at least a fraction of the voltage applied across said cell, a resistance coupled in said circuit between said source and one of said terminals, a voltage source coupled to said resistance to develop thereacross a voltage which in said circuit is series aiding with said exciting voltage, a current detecting means coupled in said circuit in series relation with said resistance and adapted responsive to cell current in said circuit to control as a substantially linear function of said current said series aiding voltage developed by said voltage source, said current detecting means, voltage source and resistance forming components of a feedback system of which at least one component is controllable to vary the input/output feedback ratio of said system, and adjustable control means for controlling said one component to obtain in said linear function a pre-selected ratio between the values of said series aiding voltage and said cell current.

21. Polarograph apparatus as in claim 20 in which said voltage source is said controllable component of said feedback system.

22. Polarograph apparatus for use with an electrochemical test cell, said apparatus comprising a circuit with a pair of terminals to apply voltage across said cell, an electrical energy source coupled in said circuit between said terminals to produce an exciting voltage which supplies through said circuit at least a fraction of the voltage applied across said cell, adjustable resistor means coupled in said circuit between said source and one of said terminals, a voltage source coupled to said resistor means to develop across at least a portion thereof a voltage which in said circuit is series aiding with said exciting voltage, electro-mechanical translator means having an electrical input coupled between said terminals to receive current passing through said cell as an input, and a mechanical output coupled to said adjustable resistor means, said translator means being adapted in response to said input current and by adjusting said resistor means to control as a function of said input current the said series aiding voltage developed by said voltage source.

23. Polarograph apparatus comprising, a loop circuit including the serially coupled elements of an electrochemical test cell, first and second resistors and a source of exciting voltage which changes over a time interval, said apparatus further comprising an amplifier having its input coupled to receive the voltage developed across said first resistor and its output coupled with said second resistor to develop a voltage thereacross in series-aiding relation with said exciting voltage, and an adjustable control for varying the quantitative relation between the amount of current passing through said first resistor and the amount of voltage applied across said cell.

24. Polarograph apparatus as in claim 23 wherein said first and second resistors are of small order relative to the internal resistance of said cell.

References Cited in the file of this patent

UNITED STATES PATENTS

| | | |
|---|---|---|
| 2,232,211 | Cary | Feb. 18, 1941 |
| 2,367,746 | Williams | Jan. 23, 1945 |
| 2,659,047 | Cherry et al. | Nov. 10, 1953 |
| 2,659,234 | Harrison | Nov. 17, 1953 |
| 2,674,719 | Williams | Apr. 6, 1954 |
| 2,704,826 | Wiegand | Mar. 22, 1955 |